(12) United States Patent
Huang

(10) Patent No.: US 10,878,781 B2
(45) Date of Patent: Dec. 29, 2020

(54) IMAGE PROCESSING METHOD AND HEAD-MOUNTED DISPLAY SYSTEM

(71) Applicant: Chun-Ding Huang, Taipei (TW)

(72) Inventor: Chun-Ding Huang, Taipei (TW)

( * ) Notice: Subject to any disclaimer, the term of this patent is extended or adjusted under 35 U.S.C. 154(b) by 0 days.

(21) Appl. No.: 16/449,459

(22) Filed: Jun. 24, 2019

(65) Prior Publication Data

US 2020/0051528 A1 Feb. 13, 2020

Related U.S. Application Data

(60) Provisional application No. 62/716,367, filed on Aug. 9, 2018.

(30) Foreign Application Priority Data

Dec. 27, 2018 (TW) .............................. 107147513 A

(51) Int. Cl.
*G09G 5/37* (2006.01)
*G06F 3/01* (2006.01)
*G02B 27/00* (2006.01)
*G06T 5/00* (2006.01)

(52) U.S. Cl.
CPC ............... *G09G 5/37* (2013.01); *G06F 3/011* (2013.01); *G06F 3/012* (2013.01); *G06F 3/013* (2013.01); *G06T 5/002* (2013.01); *G06T 5/003* (2013.01); *G09G 2320/0261* (2013.01); *G09G 2354/00* (2013.01)

(58) Field of Classification Search
CPC combination set(s) only.
See application file for complete search history.

(56) References Cited

U.S. PATENT DOCUMENTS 6,607,527 B1 * 8/2003 Ruiz ........................ A61F 9/008
606/41
2013/0106674 A1 * 5/2013 Wheeler ............ G02B 27/0176
345/8

FOREIGN PATENT DOCUMENTS

| TW | 201129083 A1 | 8/2011 |
| TW | 201129084 A1 | 8/2011 |
| TW | I530272 B | 4/2016 |
| TW | 201716827 A | 5/2017 |

* cited by examiner

*Primary Examiner* — Wesner Sajous
(74) *Attorney, Agent, or Firm* — CKC & Partners Co., LLC

(57) ABSTRACT

An image processing method includes the following operations: generate a display image by a display device; obtain an eye focus position by a photographic device; sense a head rotation angle to generate a head movement information by a sensing device; sense a body movement to generate a body movement information by a monitoring device; generate a focus target in the display image according to the eye focus position, generate a reference axis according to the focus target, and generate the display image according to the reference axis, the head movement information and the body movement information by a processing device.

12 Claims, 16 Drawing Sheets

IMAGE PROCESSING METHOD AND HEAD-MOUNTED DISPLAY SYSTEM

RELATED APPLICATIONS

This application claims priority to U.S. Provisional Application Ser. No. 62/716,367, filed Aug. 9, 2018 and Taiwan Application Serial Number 107147513, filed Dec. 27, 2018, which are herein incorporated by reference.

BACKGROUND

Field of Invention

The present of the disclosure relates to an image processing method and a head-mounted display system. More particularly, the present disclosure relates to a head-mounted display system and an image processing method according to the principle of human vision.

Description of Related Art

The main stimulus of virtual images comes from visual information. Traditional virtual images chase moving targets by turning the head. In order to adapt to the change of head and body posture, it is necessary to let the eyes re-find the target, which is not in line with the physiological operation of the human. It is easy for the user to feel uncomfortable, such as dizziness or fatigue. Therefore, it is desirable to combine the physiological phenomena of human vision for viewing objects, the head movement information and the body movement information to improve the generating method of the virtual image.

SUMMARY

One aspect of the present disclosure is an image processing method. The method includes: generating a display image by a display device; obtaining an eye focus position by a photographic device; sensing a head rotation angle to generate a head movement information by a sensing device; sensing a body movement to generate a body movement information by a monitoring device; generating a focus target in the display image according to the eye focus position, generating a reference axis according to the focus target, and generating the display image according to the reference axis, the head movement information and the body movement information by a processing device.

Another aspect of the present disclosure is a head-mounted display system. The head-mounted display system includes a display device, a photographic device, a sensing device, a monitoring device and a processing device. The display device is configured to generate a display image. The photographic device is configured to obtain an eye focus position. The sensing device is configured to sense a head rotation angle to generate a head movement information. The monitoring device is configured to monitor a body movement to generate a body movement information. The processing device is configured to generate a focus target in the display image according to the eye focus position, generate a reference axis according to the focus target, and generate the display image according to the reference axis, the head movement information and the body movement information.

DETAILED DESCRIPTION

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the terms "coupled", "electrically coupled", "electrically connect" may indicate that two or more components being directly physically contacted or electrically contacted with each other, or indirectly physically contacted or electrically contacted with each other. That is, intervening elements may be present. Moreover, "electrically connect" or "connect" may further refer to the interoperation or interaction between two or more elements.

Figure 1:
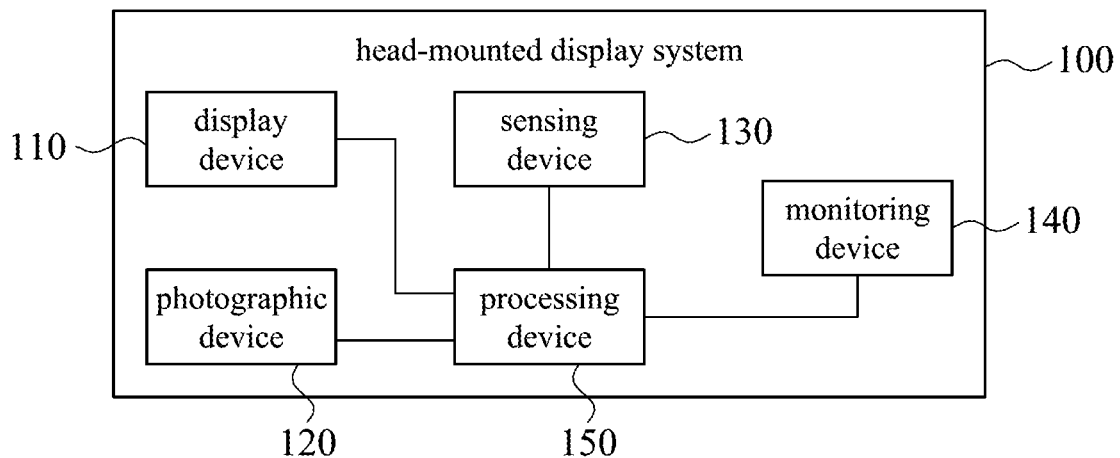
FIG. 1 is a function block diagram of a head-mounted display system according to an embodiment of the present disclosure.

Referring to FIG. 1, FIG. 1 is a function block diagram of a head-mounted display system 100 according to an embodiment of the present disclosure. The head-mounted display system 100 includes a display device 110, a photographic device 120, a sensing device 130, a monitoring device 140 and a processing device 150. In an embodiment, the head-mounted display system 100 may be a helmet, smart glasses or a device for displaying or providing virtual reality (VR), augmented reality (AR) or mixed reality (MR). For example, the display device 110 may be a display screen for displaying virtual reality images. The photographic device 120 may be a high speed camera for obtaining the position of the eyeballs. The sensing device 130 may be a sensor mounted in the head-mounted image system 100. The monitoring device 140 may be a wall-mounted monitor, a built-in monitor, a device or accessory located on limbs or torso, such as a glove, a handle, a foot cover, a pedal, a steering wheel or a video game gun, etc. The monitoring device 140 is configured to generate a body movement information. The processing device 150 may be a central processing unit, a microprocessor or other device has the function for data processing.

Figure 2:
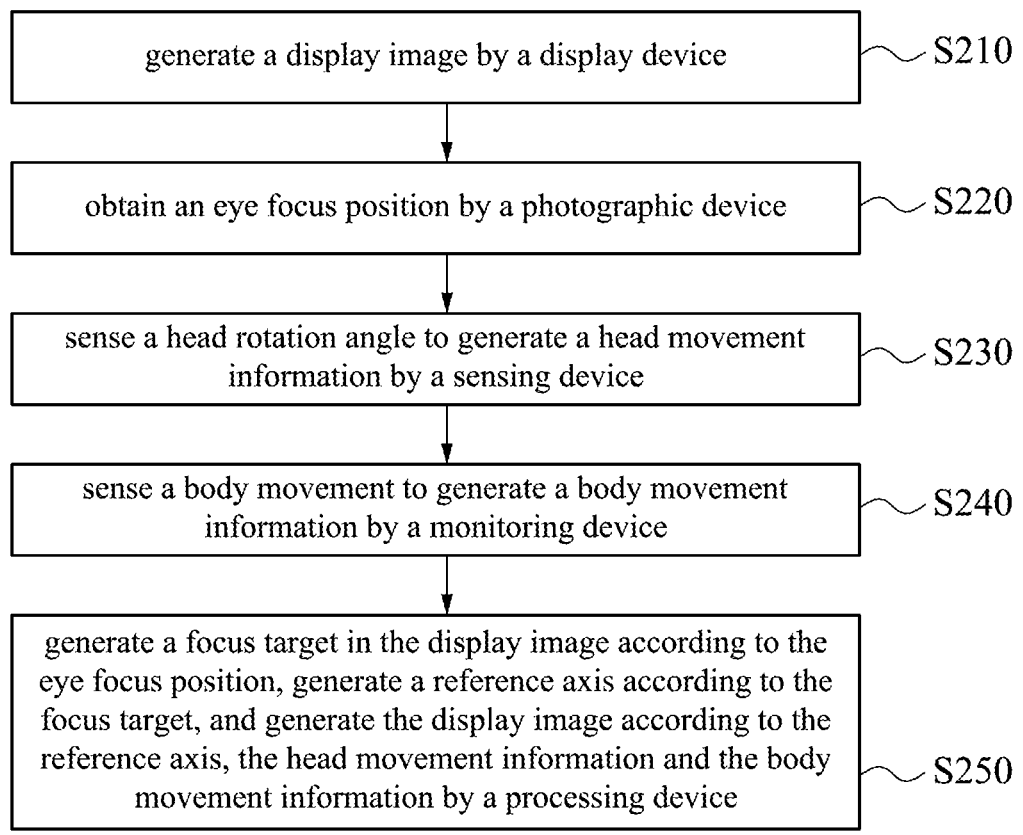
FIG. 2 is a flow chart of an image processing method according to an embodiment of the present disclosure.

Referring to FIG. 1 and FIG. 2, FIG. 2 is a flow chart of an image processing method according to an embodiment of the present disclosure. The above embodiment is taken as an example, in step S210, after a user wears the head-mounted display system 100, the head-mounted display system generates a virtual reality image for the user to watch.

In step S220, an eye focus position and a movement pattern are obtained by the photographic device 120 in the head mounted image system 100. In this embodiment, the photographic device 120 may be a high speed camera which can accurately obtain subtle changes of the eye focus position. In step S230, the sensing device 130 in the head-mounted display system 100 is capable of sensing the angle at which the user's head rotates, and generates a head movement information, such as looking up, bowing, turning left or turning right.

In step S240, the monitoring device 140 is illustrated by an example of a wall-mounted monitor. The monitoring device 140 is configured to generate a body movement information, which includes a body posture, a movement, position, a speed, facial expression, a speaking movement or a head to foot distance, etc. According to the use of different accessories, it also includes accessory position information or function enablement information, etc.

In step S250, the processing device 150 in the head-mounted display system 100 generates a focus target in the display image by the eye focus position of the photographic device 120. The focus target is where the user views in the VR, such as objects, people or scenes. The processing device 150 generates a reference axis according to the focus target, the reference axis includes a line between the eye position and the focus target, that is, the center line of the user's line of sight. The processing device 150 generates the display image centered on the reference axis, and converts the video content in the display image by using the focus target as a fulcrum. The spatial structure of the scene is centered by the focus target.

Figure 3:
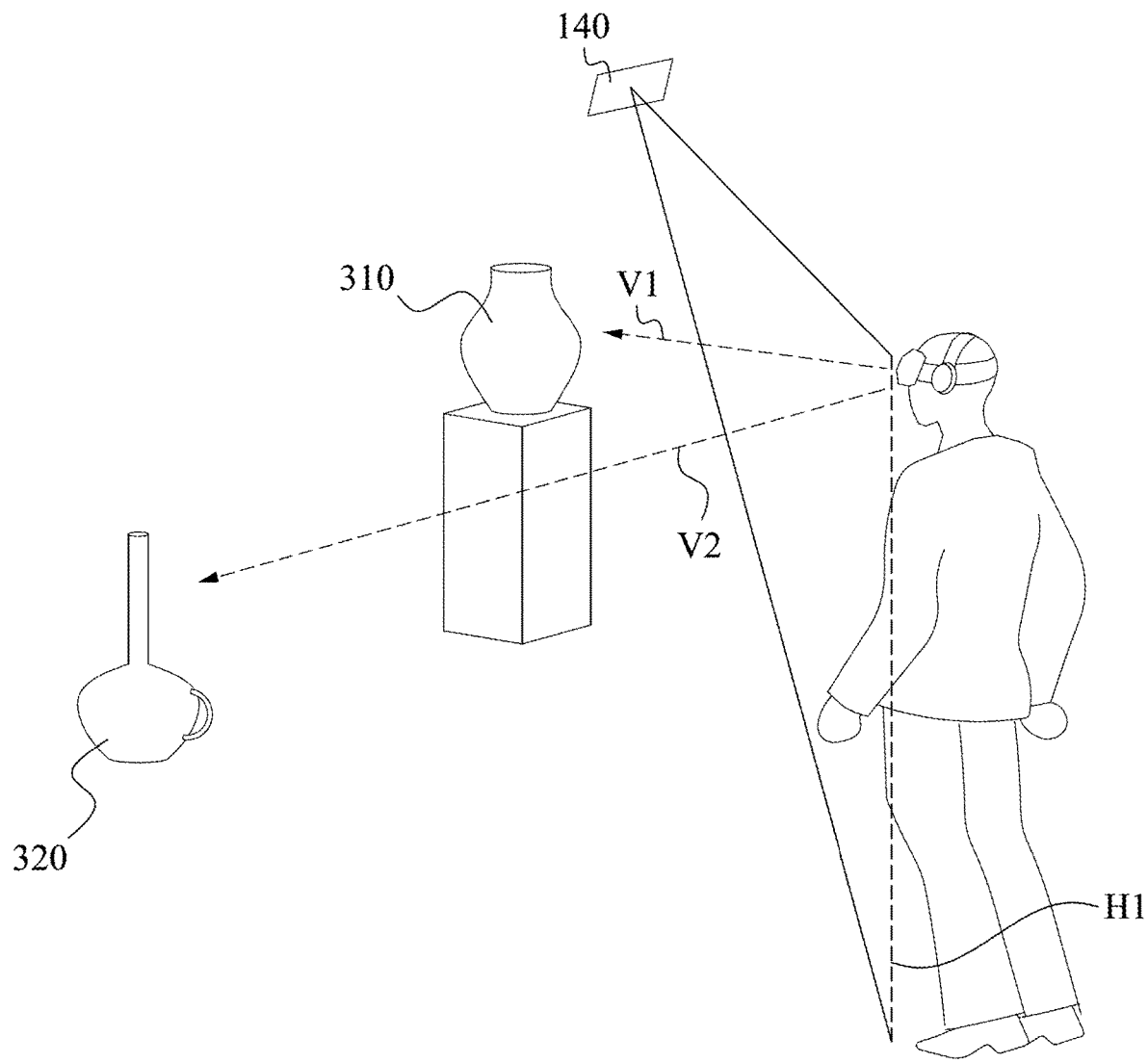
FIG. 3 is a schematic diagram of a change of a reference axis and a head to foot distance according to an embodiment of the present disclosure.

Referring to FIG. 3, FIG. 3 is a schematic diagram of a change of a reference axis and a head to foot distance according to an embodiment of the present disclosure. In FIG. 3, when the user views an object 310, the focus is on the object 310, a line of sight V1 is the reference axis. The processing device 150 in FIG. 1 generates the display image by using the line of sight V1 as a center. When the user views an object 320, the focus is changed from the object 310, at this time, the line of sight V2 is the reference axis, the processing device 150 in FIG. 1 generates the display image centering on the line of sight V2.

Figure 4:
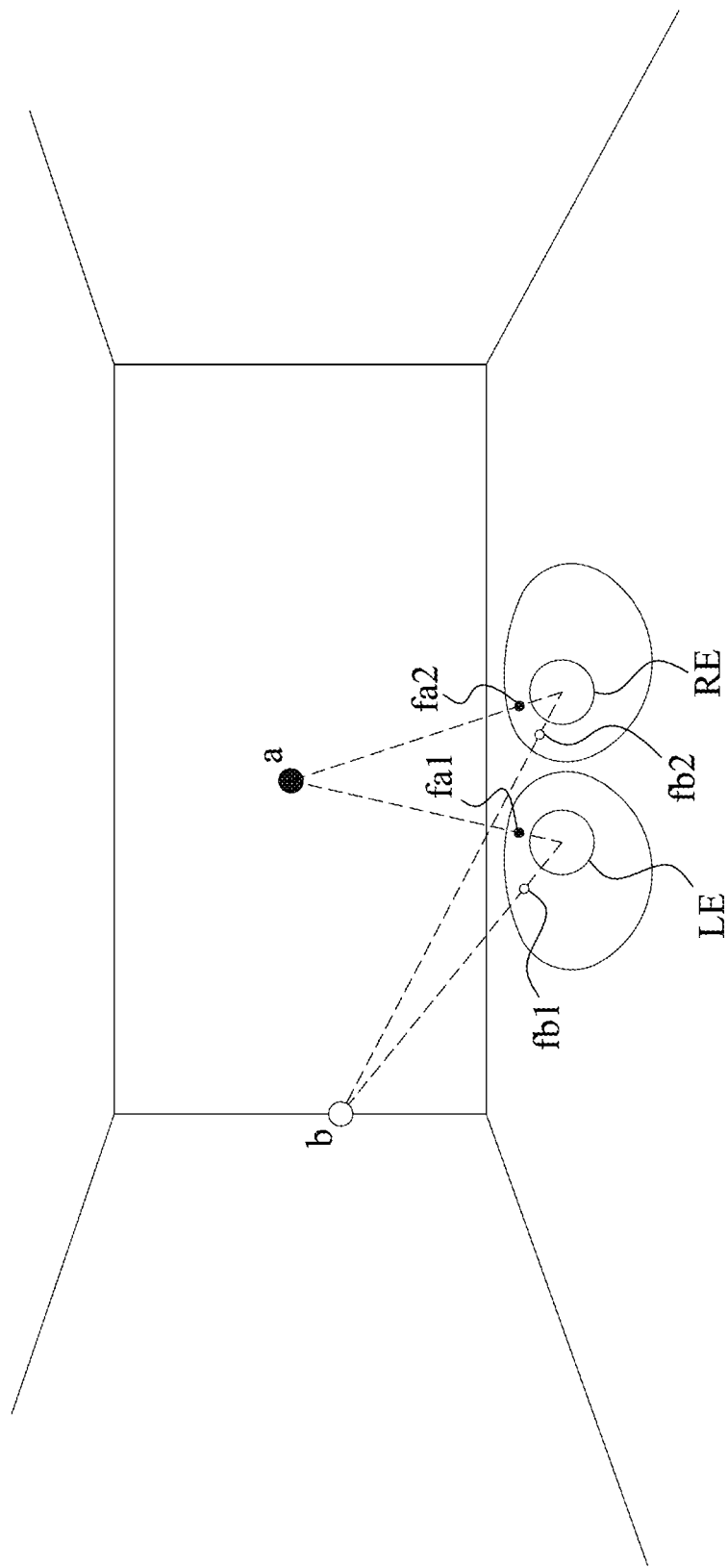
FIG. 4 is a schematic diagram of an eye focus position and a focus target according to an embodiment of the present disclosure.
Figure 5:
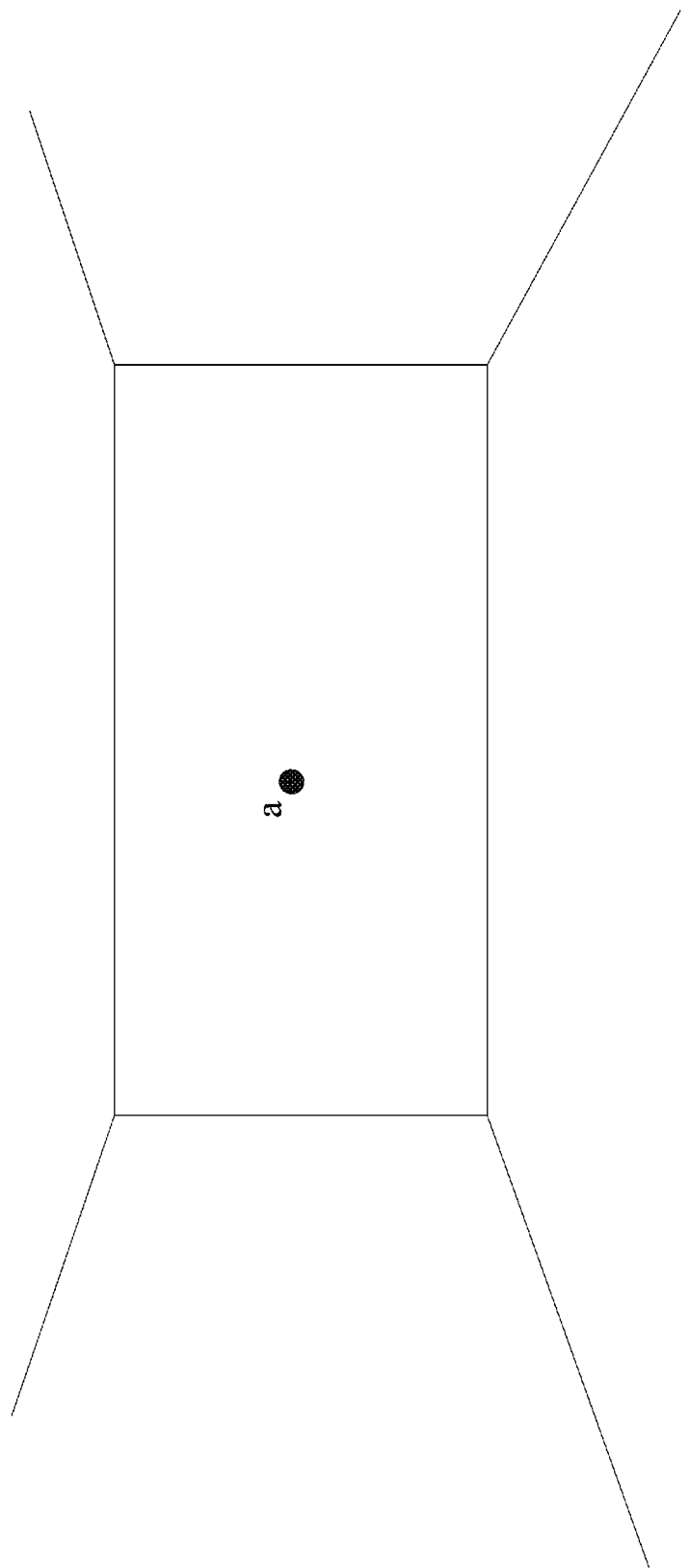
FIG. 5 is a schematic diagram of a generation of a display image based on the focus target according to an embodiment of the present disclosure.
Figure 6:
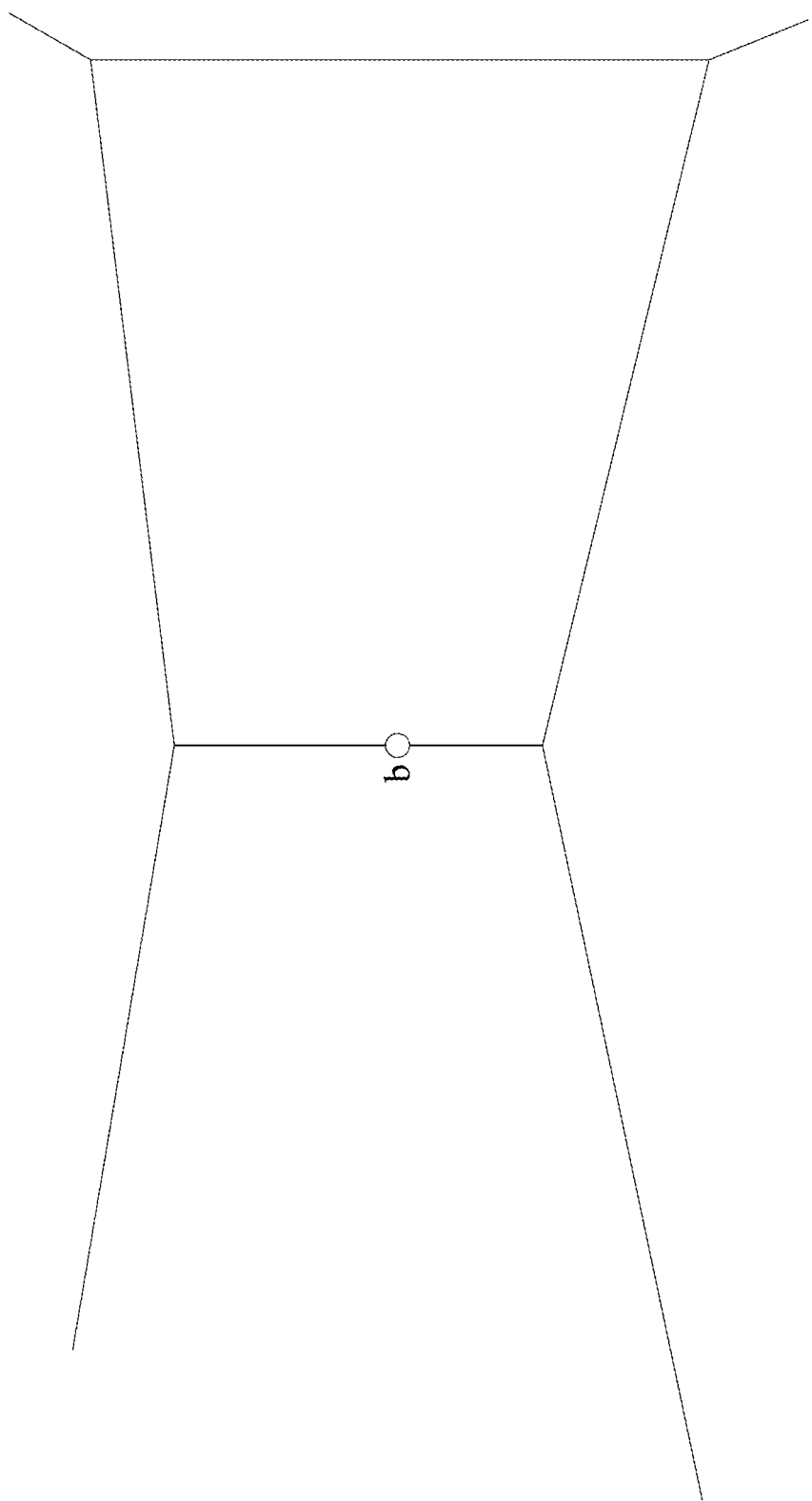
FIG. 6 is a schematic diagram of a change of the display image for different focus target corresponding to FIG. 5.

Referring to FIG. 4-FIG. 6, FIG. 4 is a schematic diagram of an eye focus position and a focus target according to an embodiment of the present disclosure. FIG. 5 is a schematic diagram of a generation of a display image based on the focus target according to an embodiment of the present disclosure. FIG. 6 is a schematic diagram of a change of the display image for different focus target corresponding to FIG. 5. In FIG. 4, when the user views a point a, an eye focus position fa1 of a left eye LE and an eye focus position fa2 of a right eye RE are generated. At this time, the point a is the focus target to generate the reference axis, and the display image is generated by the reference axis, as shown in FIG. 5. When the user views a point b without head moving, an eye focus position fb1 of the left eye LE and an eye focus position fb2 of the right eye RE are generated, the point b is the focus target to generate the reference axis, and the display image is generated by the reference axis, as shown in FIG. 6. Namely, the generation of the display image is centered on the focus target and the reference axis. Therefore, the display images generated by the focus targets at different positions will be different, like seeing different scenes because of different focus when watching different things in the real world.

Figure 7:
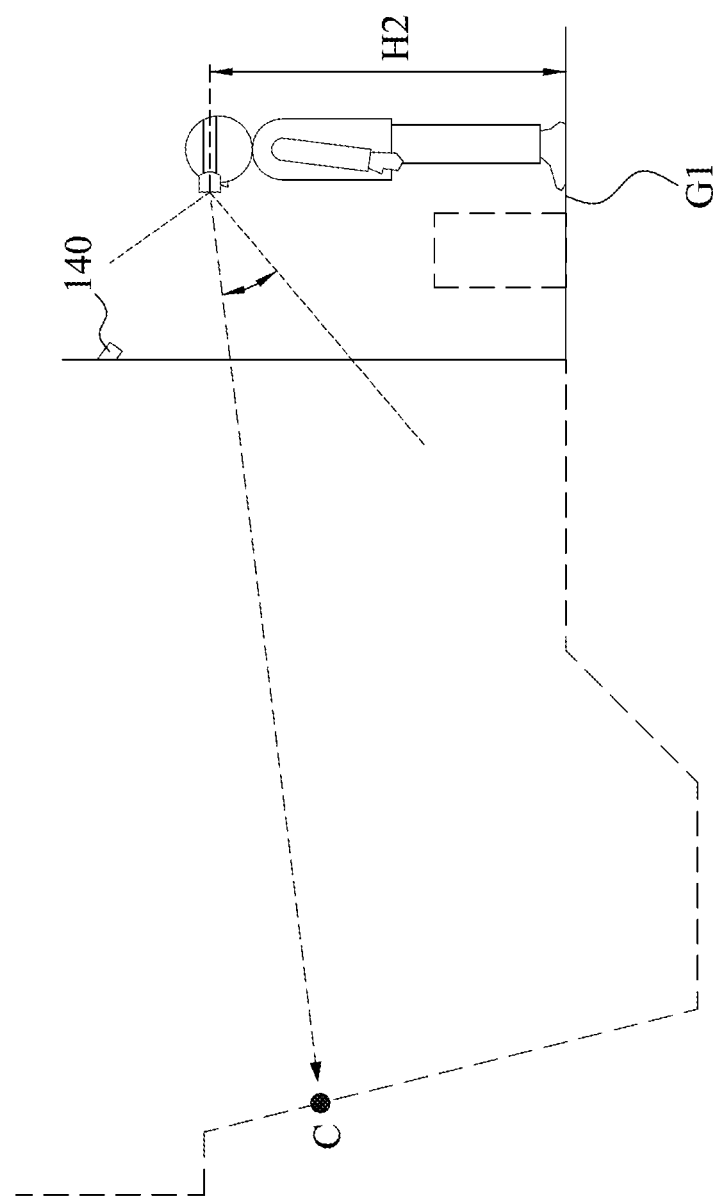
FIG. 7 is a schematic diagram of a head to foot distance according to an embodiment of the present disclosure.
Figure 8:
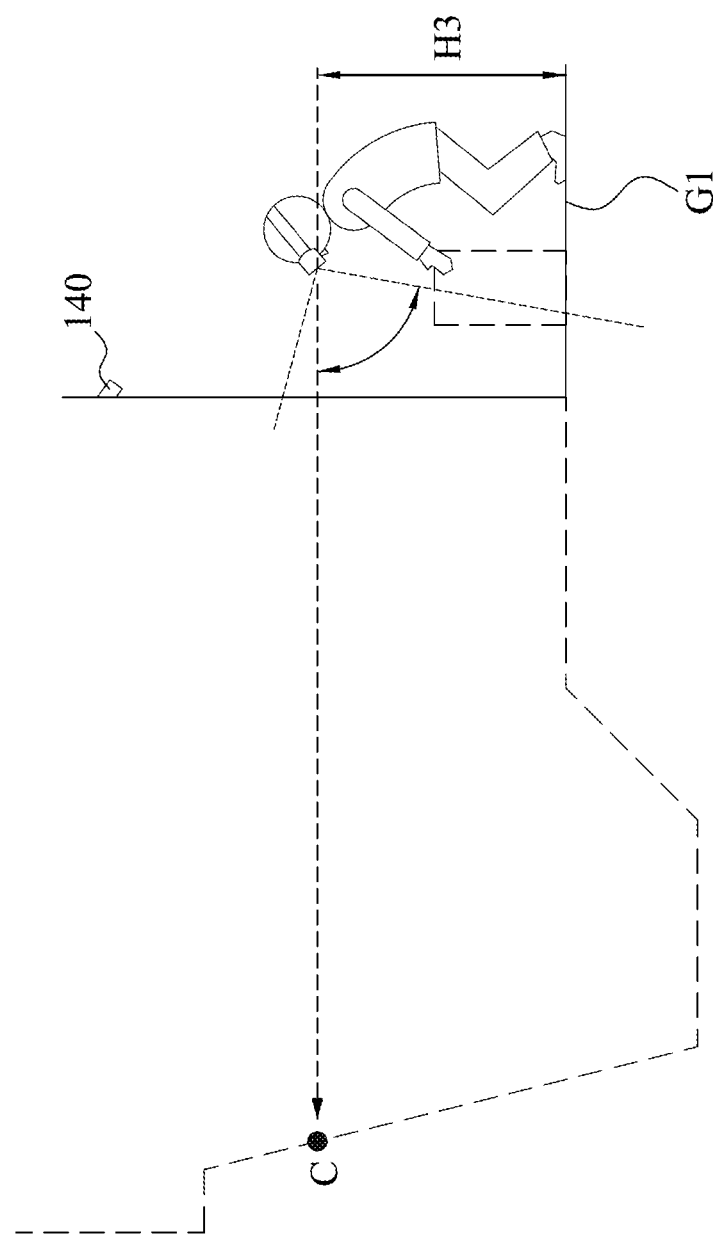
FIG. 8 is a schematic diagram of a change of the head to foot distance corresponding to FIG. 7.

Referring to FIG. 7 and FIG. 8, FIG. 7 is a schematic diagram of a head to foot distance according to an embodiment of the present disclosure. FIG. 8 is a schematic diagram of a change of the head to foot distance corresponding to FIG. 7. In FIG. 7 and FIG. 8, the dotted line is the virtual imaging scene, and the solid line is the real world environment. In this embodiment, the monitoring device 140 is a wall-mounted monitor, and configured to monitor the user movement. In FIG. 7, when the user stands and watches a point C, the monitoring device 140 detects the user is standing, a height H2 of the head to foot distance is obtained, and a stand plane G1 is established according to the height H2.

In FIG. 8, when the user views the point C and bends down to take the object, the monitoring device 140 detects the user is bent, a height H3 of the head to foot distance is obtained. The point C is taken as a focus point in FIG. 7 and FIG. 8, however, due to the difference of posture, head position, height H2 and height H3, the angle between the boundary of visual field and the reference axis is also different, like the changes indicated in FIG. 7 and FIG. 8, and the image will be different.

Figure 9:
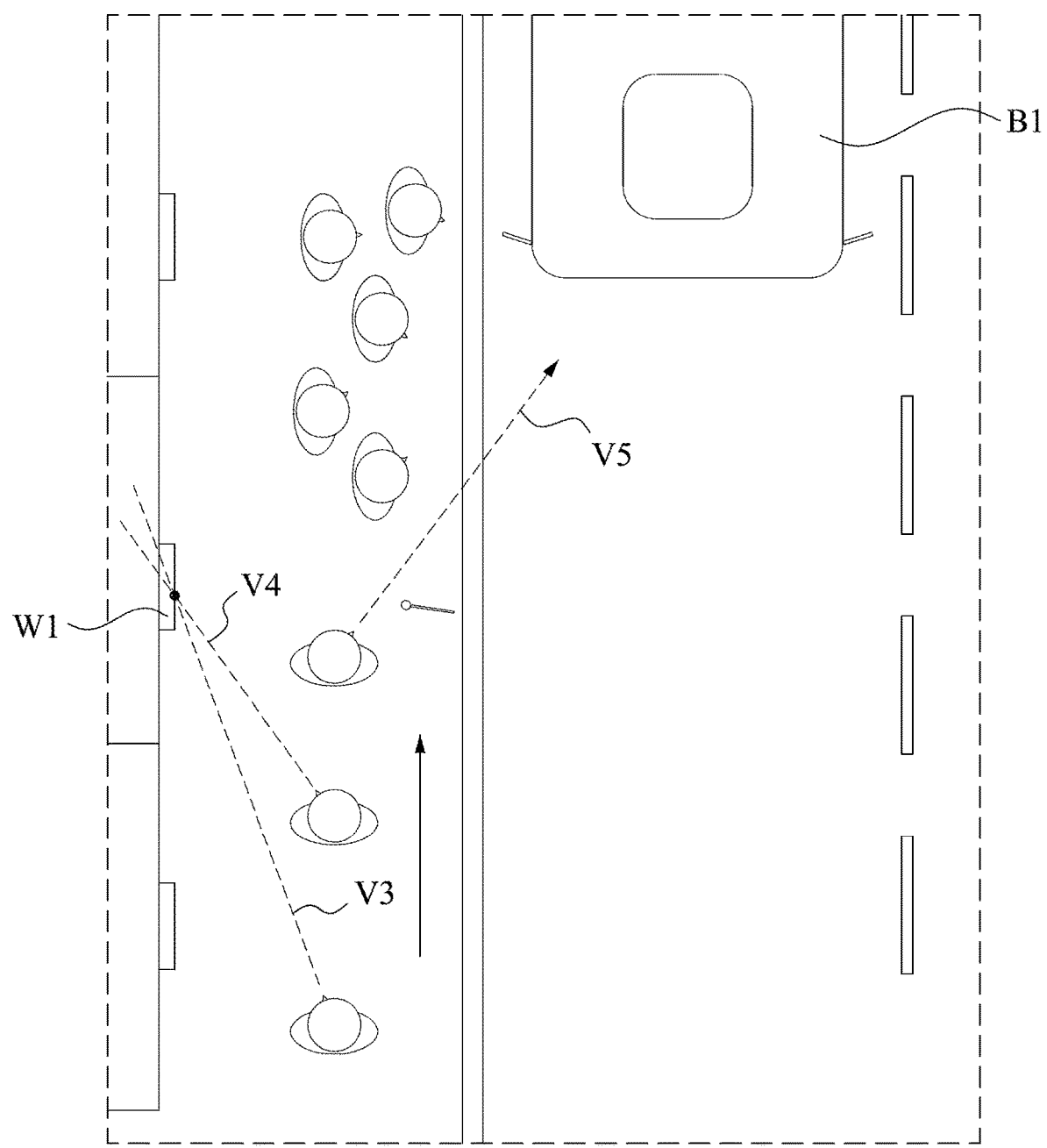
FIG. 9 is a schematic diagram of a change of a reference axis according to an embodiment of the present disclosure.
Figure 10:
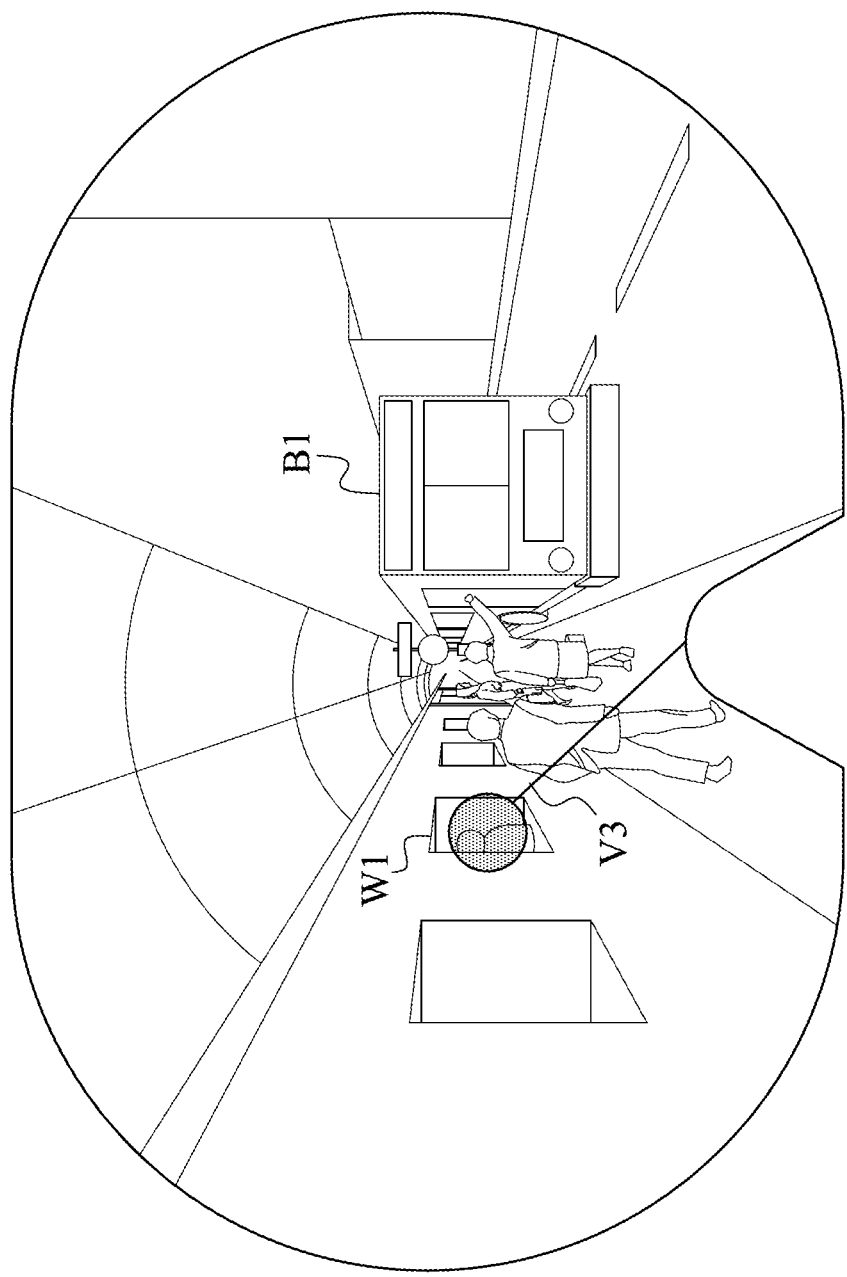
FIG. 10 is a schematic diagram of the change of the reference axis following FIG. 9.
Figure 11:
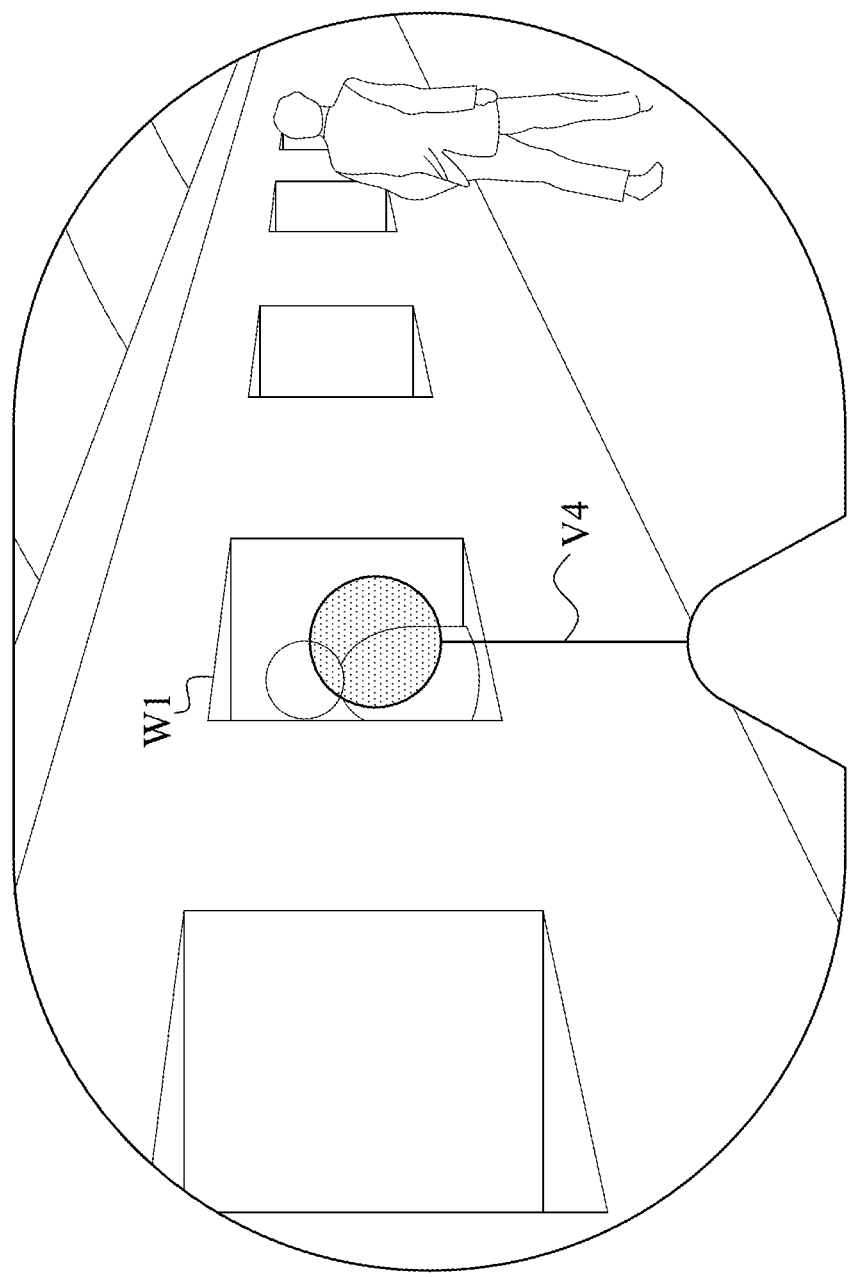
FIG. 11 is a schematic diagram of the change of the reference axis following FIG. 10.
Figure 12:
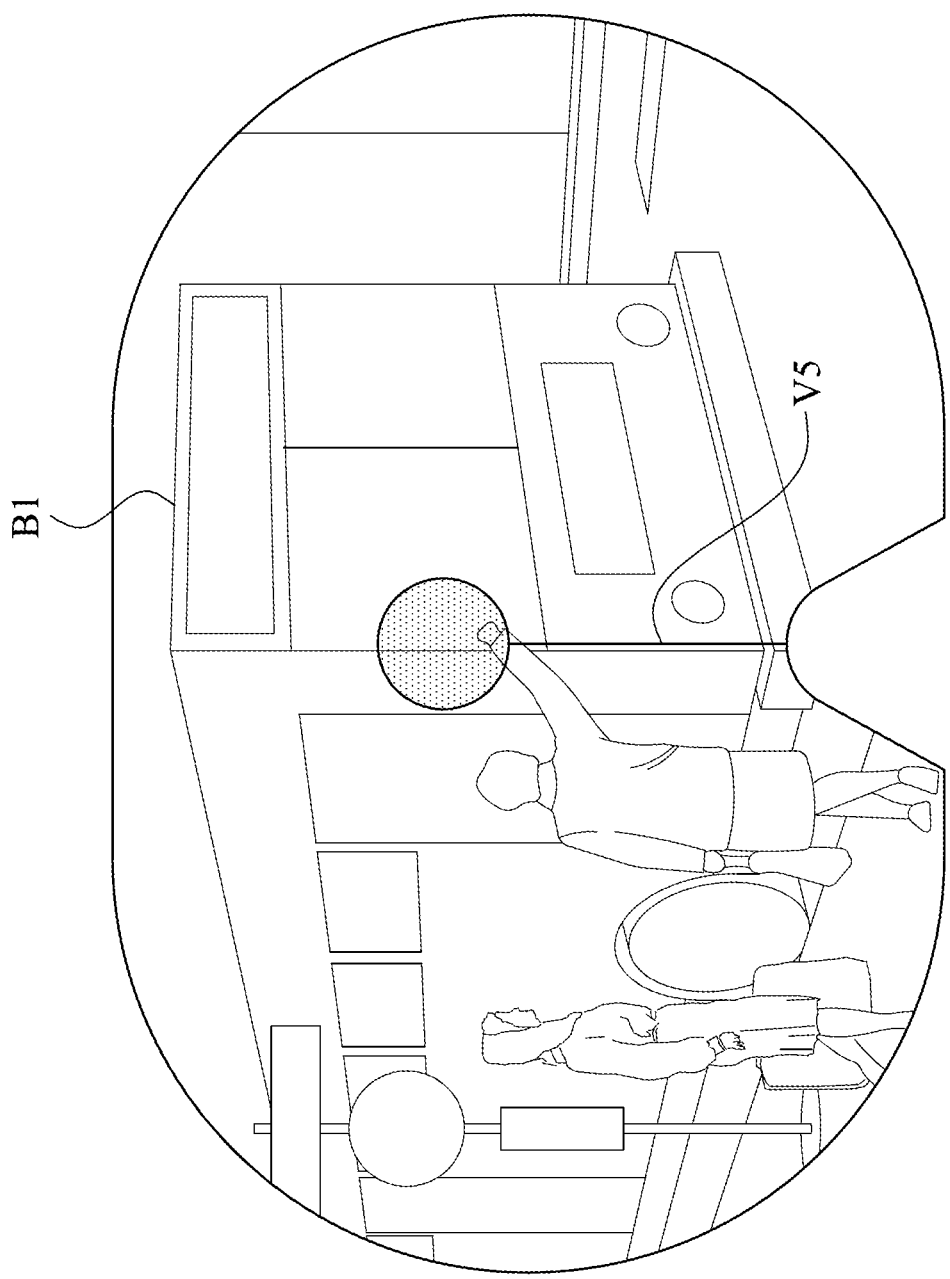
FIG. 12 is a schematic diagram of the change of the reference axis following FIG. 11.

Referring to FIG. 9-FIG. 12, FIG. 9 is a schematic diagram of a change of a reference axis according to an embodiment of the present disclosure. FIG. 10 is a schematic diagram of the change of the reference axis following FIG. 9. FIG. 11 is a schematic diagram of the change of the reference axis following FIG. 10. FIG. 12 is a schematic diagram of the change of the reference axis following FIG. 11. In daily life, when people move while watching, the eyes have physiological phenomena of vestibulo-ocular reflex (VOR) and saccade. The vestibulo-ocular reflex makes it possible for people look at things while moving, the view stays steady and stable due to the phase-reversal movements of eyes and body, and the saccade is a phenomenon of fast change of focus. In FIG. 9 and FIG. 10, in a first time, a person watches a window W1 on the roadside with a line of sight V3. In a second time, the person moves forward and continues to watch the window W1, the line of sight V3 becomes a line of sight V4, as shown FIG. 11. At this time, the vestibular eye reflection makes it possible for the person to clearly view the window W1 without blur due to moving and changing the line of sight (the line of sight V3 continues to change to the line of sight V4). The person continuously moves forward, in a third time, the sight jumps to a bus B1, the sight becomes a line of sight V5, the focus also changed from window W1 to bus B1, as shown in FIG. 12. The saccade occurred when the line of sight V4 is changed to the line of sight V5. The reference axis is rotated with the focus target as a fulcrum when the scene, head, or person in the display image is moving and the focus target is not moving. In this embodiment, when the line of sight changes from the line of sight V3 to the line of sight V4, the window W1 which is the focus target is used as the fulcrum, and the line of sight V3 is rotated to the line of sight V4. The vestibulo-ocular reflex occurred when the line of sight V3 is changed to the line of sight V4.

Figure 13:
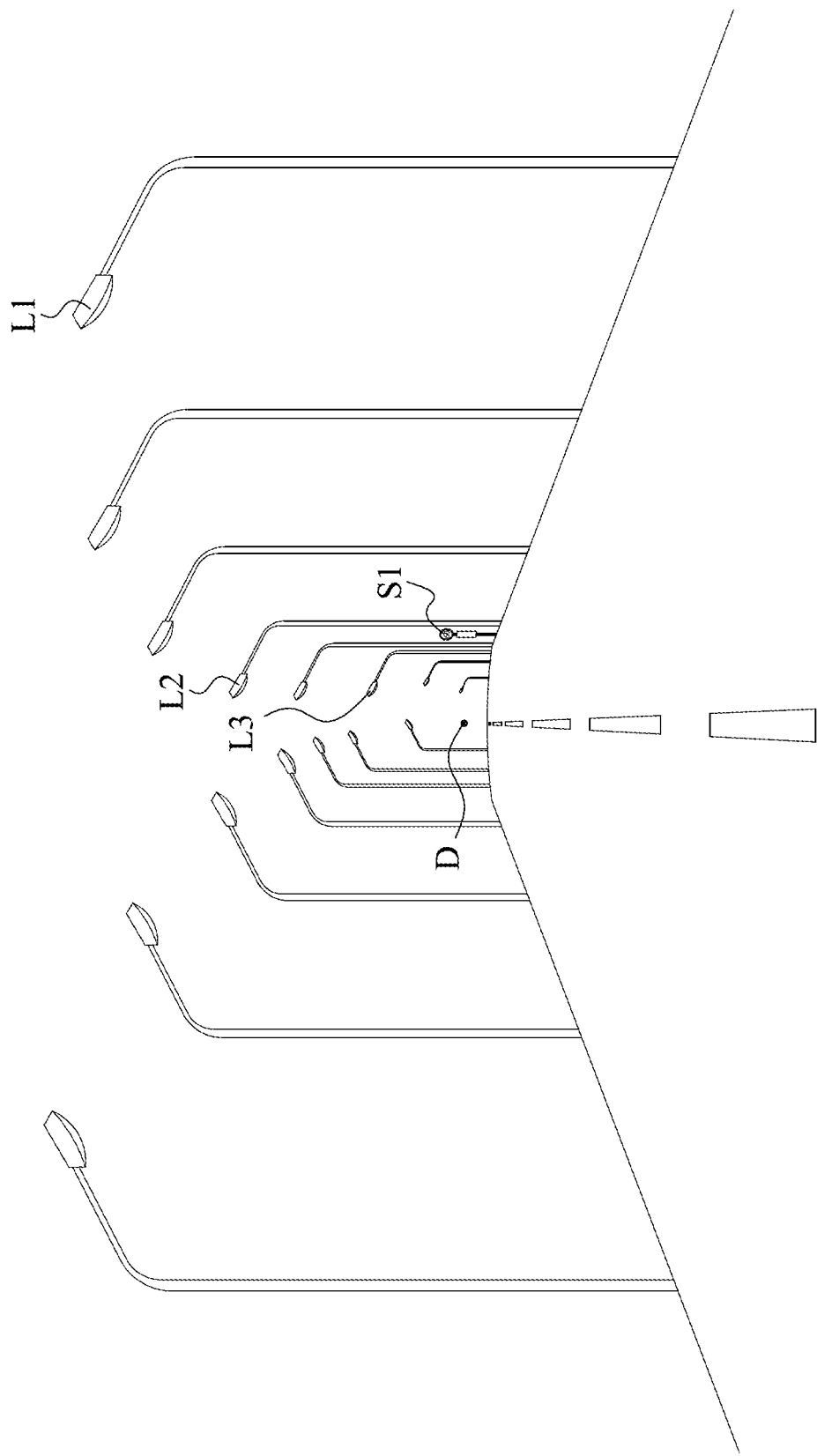
FIG. 13 is a schematic diagram of a change of a focus target according to an embodiment of the present disclosure.
Figure 14:
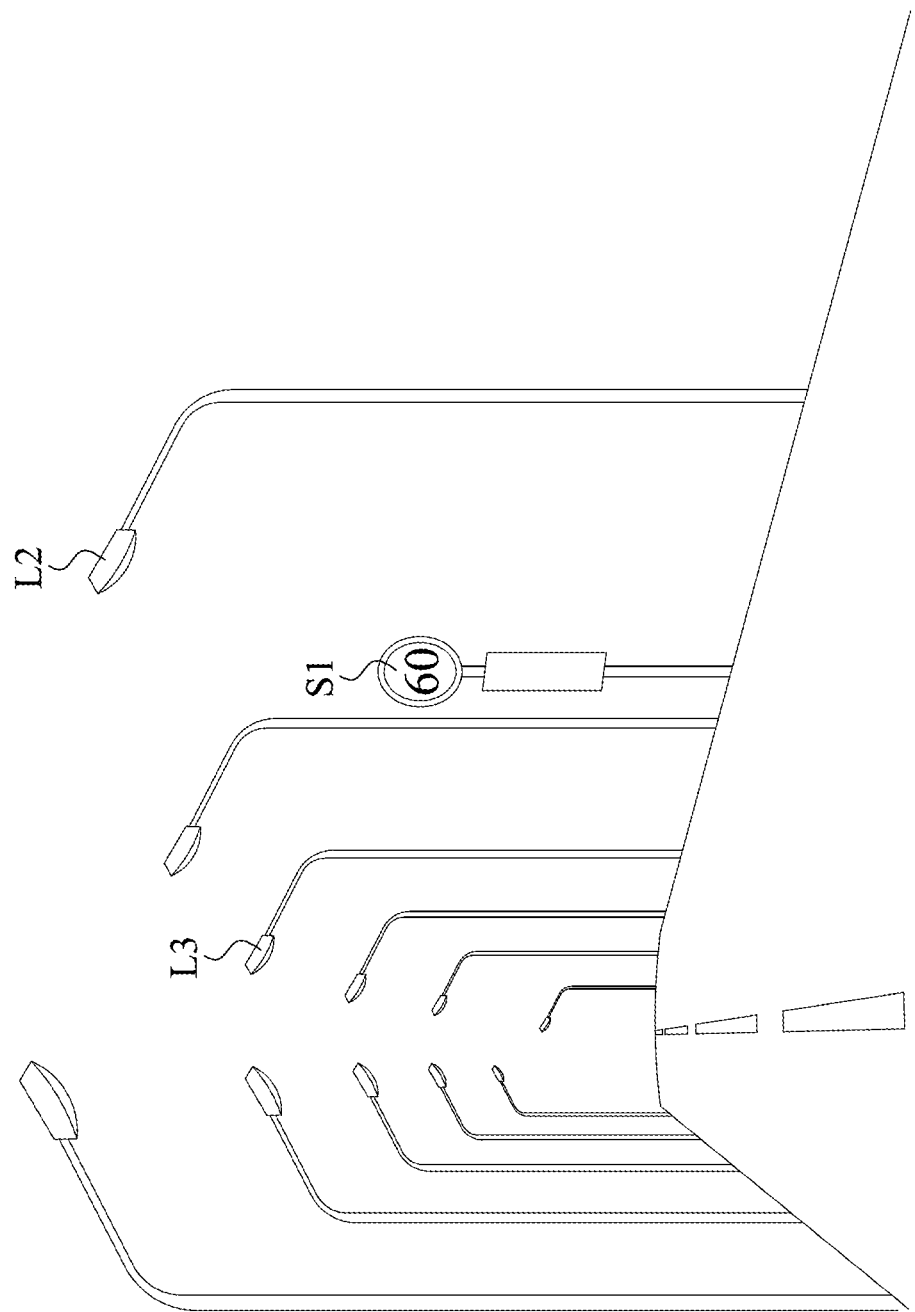
FIG. 14 is a schematic diagram of a change of the focus target following FIG. 13.

Referring FIG. 13-FIG. 14, FIG. 13 is a schematic diagram of a change of a focus target according to an embodiment of the present disclosure. FIG. 14 is a schematic diagram of a change of the focus target following FIG. 13. When driving, for example, a person notices a point D in the distance and continues driving forward, a street lamp L1 leaves the field of view, then notices a sign S1 and the focus target becomes the flag S1.

Figure 15:
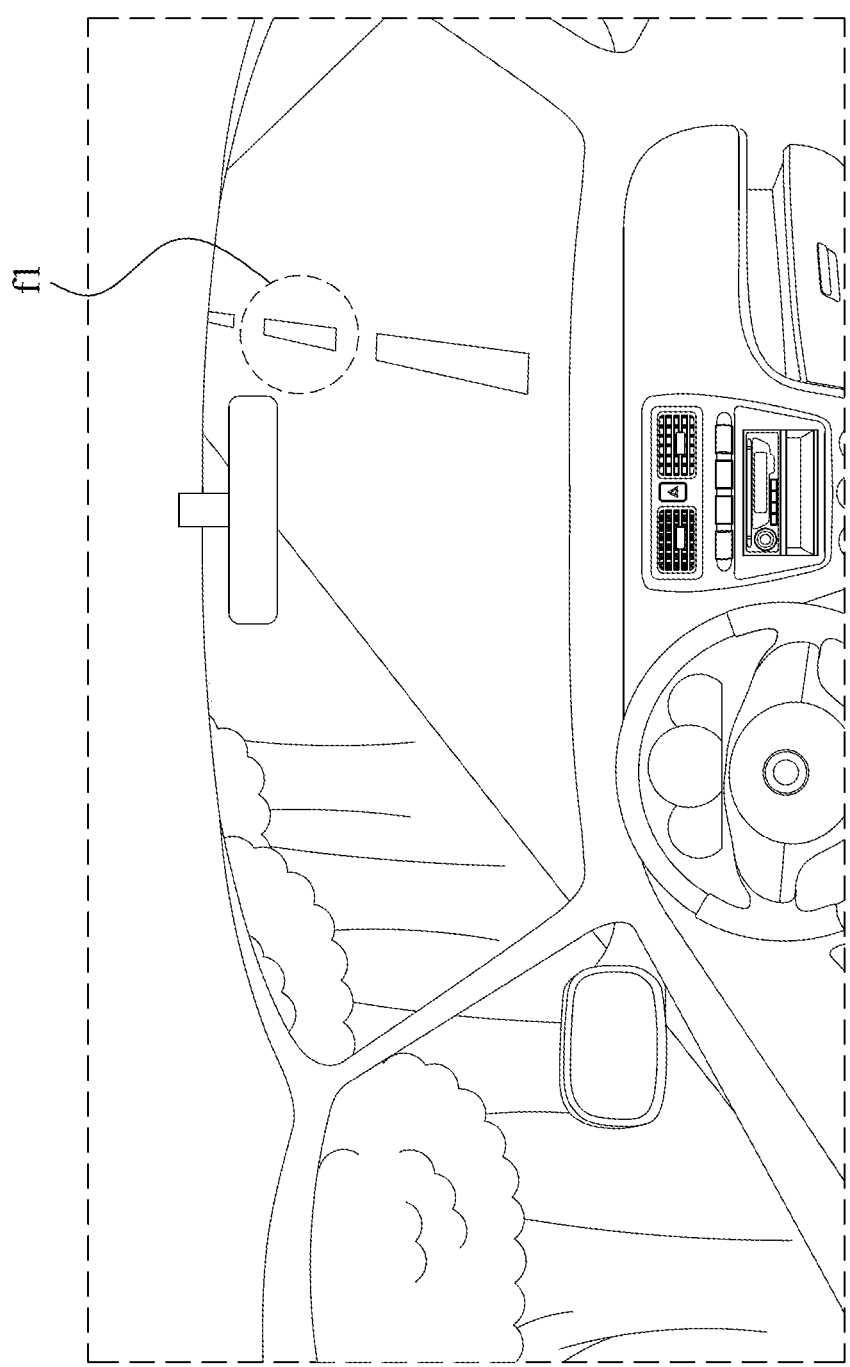
FIG. 15 is a schematic diagram of a focus area according to an embodiment of the present disclosure.
Figure 16:
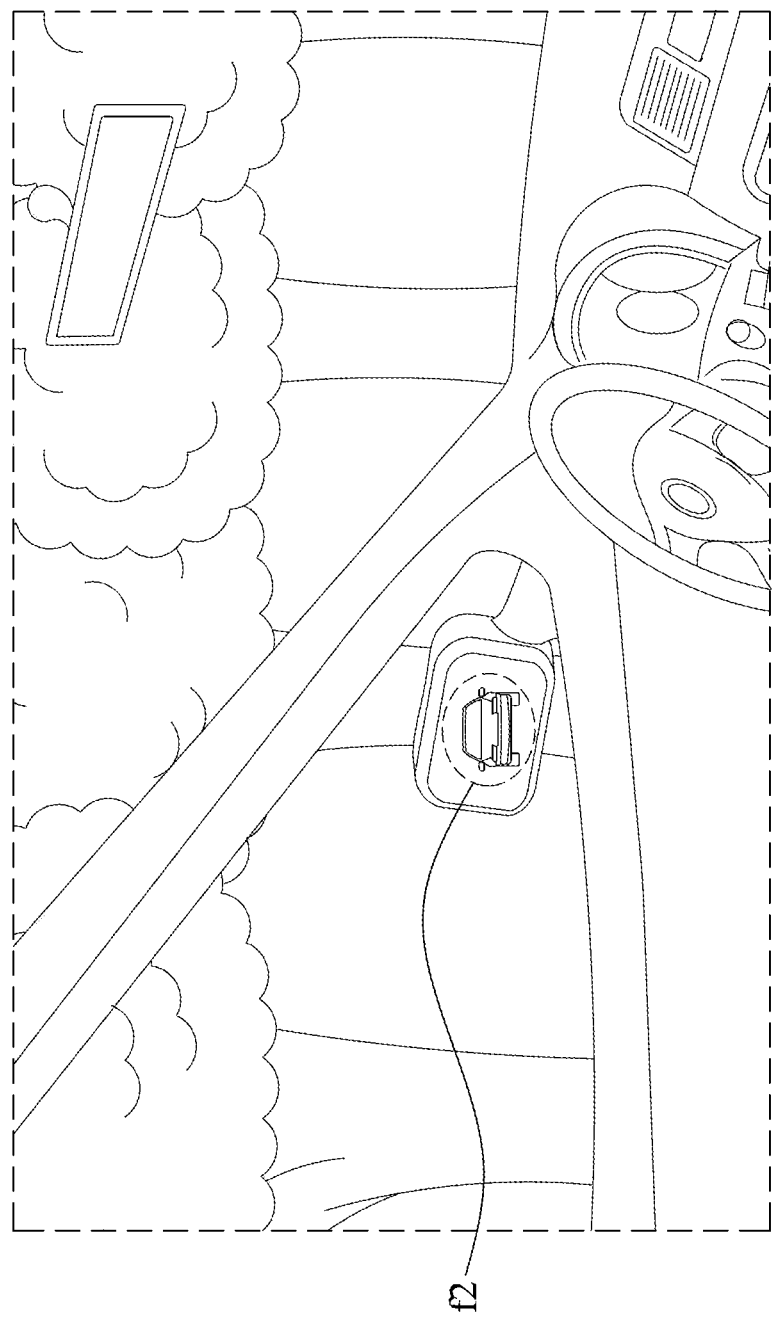
FIG. 16 is a schematic diagram of the change of the reference axis and the focus area following FIG. 15.

When the human eye views an object in daily life, the focus and around the focus are clear and the place outside the focus is relatively blurred. In the human eye, the focus is the clearest around 20 to 30 degrees, and the area outside the focus is gradually blurred. Referring to FIG. 15-FIG. 16, FIG. 15 is a schematic diagram of a focus area according to an embodiment of the present disclosure. FIG. 16 is a schematic diagram of the change of the reference axis and the focus area following FIG. 15. When driving, the road ahead is usually noticed, in this embodiment, a focus area f1 is the clearest. Referring to FIG. 16, when looking back to a rearview mirror, a focus area f2 becomes the clearest. In an embodiment, the processing device 150 performs a clear processing on the image of the focus area around the focus target in the display image, and the processing device 150 blurs the display image outside the focus area. The size of the focus area can be adjusted according to the actual application and the different display images.

In an embodiment, when the display brightness of the displayed image is higher than the reference display brightness, the processing device 150 performs a clear processing on the image of the focus area around the focus target in the display image. When the brightness of the display image is high, such as when there is sunlight during the day, the sharpness of the focus will be more pronounced than the part outside the focus. When there is no sunlight at night or when there is no light in the dark, the sharpness of the focus is less distinct from the rest of the focus. The way to set the reference display brightness can be to calculate the RGB average of the pixels or other calculations.

In an embodiment, the processing device 150 sets a plurality of targets in the display image as focus targets in advance. The pluralities of targets include people, objects, or graphics in the display image that are brighter than the reference display brightness. It is easier for the human eye to notice objects with higher brightness, so the part of the display image with higher brightness may be the part of the user's attention.

Human vision tends to use a stable target to create extensity, for high-speed continuous images, use optokinetic reflex (OKR) and nystagmus to blur or ignore high-speed moving or changing objects. In an embodiment, when a moving frequency of an object in the display image is higher than a reference moving frequency, the processing device 150 blurs the object. Here we explain the moving frequency of an object, because the area seen by the human eye is a sector, the moving frequency of the object is an angular frequency or an angular rate (1 Hz=360 degrees/second), and the reference moving frequency may be set by the moving angle change rate of the object.

In an embodiment, when the focus target is moving, that is, when a pursuit ocular motion occurs, the processing device 150 performs a clear processing on the image of the focus area around the focus target in the display image, performs a blur processing on the image the rest of the focus area in the display image. When the moving target enters the field of view and the pursuit ocular motion occurs, the saccade will be performed to set the sight on the new moving target. The body movement and the eye movement will naturally follow the direction of the moving target. Its purpose is to keep the focus target facing the fovea, showing the clearest image and the least moving speed. The environmental image that is spread out from the focus target is gradually blurred, and the high-speed object is more blurred. The image and stereoscopic representation of each object in the scene is also changed with the focus of the moving target and the reference axis of the eye focus position. At the end of the pursuit, such as gazing at a moving focus target until the focus target approaches the boundary of field of view, then jump to the next focus target in the field of view, or gazing the moving focus target for a period of time along the track of the focus target, saccade to the vicinity of the predicted drop point of the focus target as a new focus area.

Figure 17:
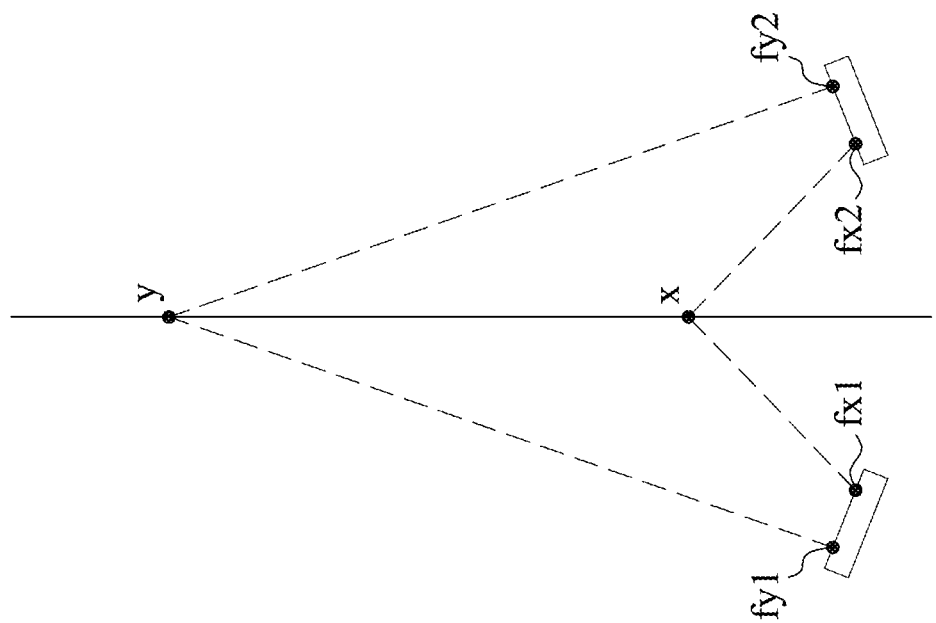
FIG. 17 is a schematic diagram of objects lining on the same reference axis with different depths of field according to an embodiment of the present disclosure.

Referring to FIG. 17, FIG. 17 is a schematic diagram of objects lining on the same reference axis with different depths of field. An object x and an object y with different depths of field are lined on the same reference axis in the display image, as shown FIG. 17. When a user watches the object x, an eye focus position fx1 and an eye focus position fx2 are obtained. The processing device 150 blurs the image outside the object x when the user watches the object x. When the user watches the object y, an eye focus position fy1 and an eye focus position fy2 are obtained. The processing device 150 blurs the image outside the object y when the user watches the object y. In an embodiment, the size of blur area may be set by the processing device 150. The effect of creating different depths of field by the above method has been consistent with the three-dimensional feeling of the human.

The clear processing methods mentioned in this disclosure may be sharpening edges, increasing color brightness, increasing color saturation, or other image processing methods that can make images sharper. The blur processing methods may be Gaussian blur or other image processing method that can make images vaguer.

Through the operation of the above embodiment, the image processing method analyzes the physiological phenomenon when the human views an object, the display image generated by the center of the reference axis between the eye focus position and the target focus, changed by the head movement information and the body movement information, so that the display image is closer to the real world, reducing the user's discomfort caused by viewing the display image and increasing the reality of the display image.

Reference will now be made in detail to the present embodiments of the disclosure, examples of which are illustrated in the accompanying drawings. It will be apparent to those skilled in the art that after understanding the embodiments of the present disclosure, various modifications and variations can be made based on the teaching of the disclosure without departing from the scope or spirit of the disclosure.

What is claimed is:

1. An image processing method, comprising:
generating a display image by a display device;
obtaining an eye focus position by a photographic device;
sensing a head rotation angle to generate a head movement information by a sensing device;
sensing a body movement to generate a body movement information by a monitoring device;
generating a focus target in the display image according to the eye focus position, generating a reference axis according to the focus target, and generating the display image according to the reference axis, the head movement information and the body movement information by a processing device, wherein the display image represents an image content of the display image by using the reference axis as a center, and the display image converts the image content of the display image by using the focus target as a fulcrum;

when a scene in the display image moves and the focus target does not move, rotating the reference axis by using the focus target as the fulcrum; and when the focus target in the display image is changed, the reference axis is changed according to the focus target which has been changed.

2. The image processing method of claim 1, further comprising:

sharpening an image of a focus area around the focus target in the display image; and blurring the image outside the focus area in the display image.

3. The image processing method of claim 2, further comprising:

when a display brightness of the display image is higher than a reference display brightness, sharpening an image of a focus area around the focus target in the display image.

4. The image processing method of claim 3, further comprising:

setting a plurality of targets in the display image as the focus target in advance, wherein the plurality of targets comprises characters, objects, or graphics whose brightness are brighter than the reference display brightness in the display image.

5. The image processing method of claim 1, further comprising:

when a moving frequency of an object in the image content of the display image is higher than a reference moving frequency, blurring the object.

6. The image processing method of claim 1, further comprising:

when the focus target is moving, sharpening the image of a focus area around the focus target in the display image; and blurring the image outside the focus area in the display image.

7. A head-mounted display system, comprising:

a display device, configured to generate a display image;

a photographic device, configured to obtain an eye focus position;

a sensing device, configured to sense a head rotation angle to generate a head movement information;

a monitoring device, configured to monitor a body movement to generate a body movement information; and a processing device, configured to generate a focus target in the display image according to the eye focus position, generate a reference axis according to the focus target, and generate the display image according to the reference axis, the head movement information and the body movement information, wherein the display device displays an image content of the display image by using the reference axis as a center, and the display image converts the image content of the display image by using the focus target as a fulcrum, wherein when a scene in the display image moves and the focus target does not move, the processing device rotates the reference axis by using the focus target as the fulcrum; and when the focus target in the display image is changed, the processing device changes the reference axis according to the focus target which has been changed.

8. The head-mounted display system of claim 7, wherein the processing device further configured to sharpen an image of a focus area around the focus target in the display image; and the processing device blurs the image outside the focus area in the display image.

9. The head-mounted display system of claim 8, wherein when a display brightness of the display image is higher than a reference display brightness, the processing device sharpens an image of a focus area around the focus target in the display image.

10. The head-mounted display system of claim 9, wherein the processing device further configured to set a plurality of targets in the display image as the focus target in advance, wherein the plurality of targets comprises characters, objects, or graphics whose brightness are brighter than the reference display brightness in the display image.

11. The head-mounted display system of claim 7, wherein when a moving frequency of an object in the image content of the display image is higher than a reference moving frequency, the processing device blurs the object.

12. The head-mounted display system of claim 7, wherein when the focus target is in a moving state, the processing device sharpens an image of a focus area around the focus target in the display image; and the processing device blurs an image outside the focus area in the display image.

\* \* \* \* \*